US007676935B2

(12) United States Patent
Mitterreiter

(10) Patent No.: US 7,676,935 B2
(45) Date of Patent: Mar. 16, 2010

(54) ANGLE-MEASUREMENT SYSTEM AND METHOD FOR PRODUCTION OF AN ANGLE-MEASUREMENT SYSTEM

(75) Inventor: Johann Mitterreiter, Chieming (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 368 days.

(21) Appl. No.: 11/855,059

(22) Filed: Sep. 13, 2007

(65) Prior Publication Data
US 2008/0066327 A1 Mar. 20, 2008

(30) Foreign Application Priority Data
Sep. 20, 2006 (DE) .................. 10 2006 044 359

(51) Int. Cl.
*G01B 5/24* (2006.01)
(52) U.S. Cl. ......................................... 33/1 PT; 33/534
(58) Field of Classification Search .................. 33/1 PT, 33/1 N, 706, 534
See application file for complete search history.

(56) References Cited

U.S. PATENT DOCUMENTS

| 4,406,939 A | | 9/1983 | Golker | |
| 5,101,102 A | * | 3/1992 | Nishimura et al. | 250/231.16 |
| 5,435,067 A | * | 7/1995 | Uchida et al. | 33/1 PT |
| 6,622,391 B1 | * | 9/2003 | Shirai et al. | 33/292 |
| 6,774,355 B2 | * | 8/2004 | Kudo | 250/231.13 |
| 7,150,103 B2 | | 12/2006 | Brandl et al. | |

FOREIGN PATENT DOCUMENTS

| DE | 30 36 005 | 5/1982 |
| DE | 196 40 895 | 4/1998 |
| EP | 0 902 257 | 3/1999 |
| EP | 1 643 216 | 4/2006 |
| JP | 2001 255335 | 9/2001 |

OTHER PUBLICATIONS

Search Report, European Patent Application No. 07 01 0846, dated Sep. 21, 2007 (translated).

\* cited by examiner

*Primary Examiner*—G. Bradley Bennett
*Assistant Examiner*—Tania C Courson
(74) *Attorney, Agent, or Firm*—Kenyon & Kenyon LLP

(57) ABSTRACT

In an angle-measurement system and a method for producing an angle-measurement system, the angle-measurement system includes a bearing assembly and a scanning head, the bearing assembly including a graduated ring, an outer ring and rolling bodies. Rolling surfaces are formed both on the graduated ring and the outer ring, the rolling surface of the graduated ring having a smaller path radius than that of the outer ring. Furthermore, the rolling surface of the outer ring is arranged opposite the rolling surface of the graduated ring, and the rolling bodies are disposed between the two rolling surfaces such that the bearing assembly is free of radial play. In addition, an angle scaling is applied directly onto the graduated ring such that a geometrical pattern of the angle scaling in a first region deviates from a geometrical pattern in a second region as a function of rotational eccentricities of the bearing assembly. The angle scaling is able to be scanned by the scanning head.

20 Claims, 3 Drawing Sheets

A

ANGLE-MEASUREMENT SYSTEM AND METHOD FOR PRODUCTION OF AN ANGLE-MEASUREMENT SYSTEM

CROSS-REFERENCE TO RELATED APPLICATIONS

The present application claims priority to Application No. 10 2006 044 359.4, filed in the Federal Republic of Germany on Sep. 20, 2006, which is expressly incorporated herein in its entirety by reference thereto.

FIELD OF THE INVENTION

The present invention relates to an angle-measurement system and to a method for producing an angle-measurement system.

BACKGROUND INFORMATION

Such angle-measurement systems are used for measuring rotary motions and rotational positions of a machine part, e.g., a shaft. The rotary motion is determined either incrementally or absolutely. The output measured value is, for example, a sequence of counting pulses, a counter value or a code word. Corresponding angle-measurement systems are used particularly in so-called pick-and-place machines in the manufacture of electronic components, or in machine tools for the measuring of rotary motions. The reproducibility or repeatability of the rotational angles of machine parts precisely to only a few angular seconds is very important when working with pick-and-place machines, for example. In particular the absolute accuracy of the measuring results of an angle-measurement system is crucial in the case of machine tools. Conventional angle-measurement systems have their own bearing assemblies for the components that are rotatable relative to one another.

The accuracy of an angle measurement is basically influenced by the quality of the angle scaling, its eccentricity, and by the radial eccentricities of the bearing assembly or by wobble errors.

German Published Patent Application No. 30 36 005 describes a method for producing an angle scaling for an angle-measurement system, in which code tracks are applied on a code disk with the aid of a laser beam. The code disk is already connected to a shaft during the writing so that the code disk is already centered relative to the shaft when the code pattern is written.

This method has the disadvantage that the angle-measurement systems produced thereby do not achieve the highest accuracies, are not sufficiently robust for many applications and, in addition, require relatively much space.

SUMMARY

According to example embodiments of the present invention, a robust angle-measurement system and a method for its production provide, e.g., for the ability to realize a compact angle-measurement system that works with the utmost precision and has a simple design.

The angle-measurement system may include a bearing assembly and a scanning head, the bearing assembly including a graduated ring, an outer ring and rolling bodies, the graduated ring being rotatable about an axis relative to the outer ring. An individual rolling surface is formed both on the graduated ring and on the outer ring, the rolling surface of the graduated ring having a smaller path radius than the rolling surface of the outer ring. The rolling surface of the outer ring is disposed opposite from the rolling surface of the graduated ring, and the rolling bodies are disposed between the two rolling surfaces such that the bearing assembly is radially free of play, i.e., has no radial bearing play. Furthermore, an angle scaling is applied directly onto the graduated ring, such that a geometrical pattern of the angle scaling in a first region deviates from a geometrical pattern of the angle scaling in a second region as a function of radial eccentricities of the bearing assembly. The angle scaling is able to be scanned by the scanning head.

The geometrical patterns of the angle scaling of the angle-measurement system are therefore dependent on, e.g., the individual measurements or measurement deviations of the particular bearing assembly installed in the angle-measurement system.

The graduated ring may be part of an inner ring of the bearing assembly. This is the case when the inner ring includes a plurality of parts. If the inner ring has a one-part arrangement, then the inner ring simultaneously constitutes the graduated ring.

The rolling surfaces are the particular surfaces or paths along which the rolling bodies are rolling during operation of the angle-measurement device. The rolling surface of the graduated ring has a convex arrangement from the viewpoint of the central axis of the graduated ring, while the rolling surface of the outer ring has a concave arrangement. The path radii of the rolling surfaces should be understood as the shortest connections between the axis and the point on the particular rolling surface that is closest to the axis.

The angle scaling may be disposed on a lateral side of the graduated ring. The lateral side should be understood as a cylindrical surface or peripheral area, which is either closed around 360° or which represents only a portion of a peripheral area. The angle scaling may be aligned so as to have a directional component parallel to the axis. Often, the angle scaling includes a multitude of graduation marks. In this case, the graduation marks are aligned so as to have a directional component parallel to the axis. In particular, the angle scaling may also include a plurality of tracks, for example, when the absolute angular position of a shaft to be measured is to be directly detectable from the angle scaling.

The graduated ring of the angle-measurement system may have an axial extension that varies in the radial direction. This means that the graduated ring may have offsets or steps, for example. Such an arrangement has a variety of advantages. For example, the inner wall or the inner region of the graduated ring may be arranged such that it has the maximum axial extension of the graduated ring. This allows the graduated ring to be mounted on a shaft to be measured so as to provide a maximum guide ratio, i.e., to achieve an optimal alignment of the angle-measurement system at the shaft to be measured during subsequent operation, and wobble errors, for example, are minimized. The graduated ring may be configured such that it is able to be mounted directly on the measuring shaft while making mechanical contact. This makes it possible to reduce accumulated tolerances to a minimum, which ultimately increases the measuring accuracy of the angle-measurement system. Furthermore, the graduated ring may be configured such that the particular region of the graduated ring (such as its lateral side) on which the angle scaling is applied, is at least partly disposed radially outside of the minimum inner diameter of the outer ring. To this end, the graduated ring may have a reduced axial extension in the region of the wraparound. The angle scaling arranged radially far outward, which is able to be produced by the mentioned arrangement, may provide that the angle scaling may have an extremely fine configuration, that is to say, allows a great number of graduation marks, for example, to be applied across the circumference.

As an alternative or in addition to the substantially axial orientation of the angle scaling, the angle scaling may also be aligned so as to have a radial directional component. In this case, at least a portion of the angle scaling is applied on the front side of the graduated ring.

Particularly excellent measuring accuracies of the angle-measurement system may be achieved if the bearing assembly also has no axial bearing play, i.e., is free of play axially.

The angle-measurement system may be configured such that its maximum axial extension amounts to less than 40%, e.g., less than 30%, of the maximum outer radius of the angle-measurement system. Furthermore, it may be provided that the angle-measurement system has a relatively large opening for accommodating a shaft to be measured, the radius of the opening, e.g., amounting to at least 50%, e.g., at least 60%, of the maximum outer radius of the angle-measurement system.

In a method according to an example embodiment of the present invention, the graduated ring and the outer ring are first produced, and a finely processed rolling surface is produced both on the graduated ring and on the outer ring. The bearing assembly is assembled such that the rolling surface of the outer ring comes to lie opposite from the rolling surface of the graduated ring and the rolling bodies are disposed between the two rolling surfaces. This is done such that the bearing assembly is free of radial play. Subsequently, the graduated ring and the outer ring are fixed in place on elements of a graduating machine that are rotatable relative to one another—such as a stator block and a shaft. In another method step, the angle scaling is applied directly onto the graduated ring, the graduated ring in this step being rotated about the axis relative to the outer ring in the graduating machine.

The angle scaling may be configured for optical scanning. For example, the angle scaling may be made up of reflective and barely reflective or non-reflective regions, so that the scanning is based on a so-called vertical illumination principle in which light reflected and modulated by the graduated ring is detected. As an alternative, the angle scaling may be configured for other scanning principles as well. For example, it is also possible to apply a magnetic graduation, or the angle scaling may be adapted for inductive scanning. The angle scaling may be such that it allows only incremental angular position data to be read out, or otherwise absolute angular positions as well, either in addition or as an alternative.

The rolling surfaces may be processed with the aid of a grinding, honing, lapping procedure, etc.

To increase the measuring accuracy during subsequent operation of the angle-measurement system, the outer ring is fixed in place on an element of the graduating machine only indirectly, via a coupler, to apply the angle scaling on the graduated ring. This coupler may remain in the angle-measurement system after application of the angle scaling. Errors attributable to the characteristic of the coupler installed in the individual case may be minimized in this manner.

Accordingly, in addition to the bearing assembly and the scanning head, the angle-measurement system may have a coupler, the coupler being dimensioned to be flexurally soft in the radial and axial direction and thus having a specific characteristic with regard to its deformation. In this case, an angle scaling is applied directly onto the graduated ring such that a geometrical pattern of the angle scaling in a first region deviates from a geometrical pattern of the angle scaling in a second region as a function of radial eccentricities of the bearing assembly and of the characteristic of the coupler.

The angle scaling may be applied directly onto the graduated ring with the aid of an ablation process, e.g., a laser ablation process.

According to an example embodiment of the present invention, an angle-measurement system includes: a scanning head; and a bearing assembly including: graduated ring; an outer ring; and rolling bodies. The graduated ring is rotatable about an axis relative to the outer ring. A separate rolling surface is formed on each of the graduated ring and the outer ring, and the rolling surface of the graduated ring has a smaller path radius than the rolling surface of the outer ring. The rolling surface of the outer ring is arranged opposite the rolling surface of the graduated ring, and the rolling bodies are arranged between the two rolling surfaces such that the bearing assembly is free of radial play. An angle scaling is applied directly onto the graduated ring such that a geometrical pattern of the angle scaling in a first region deviates from a geometrical pattern of the angle scaling in a second region as a function of rotational eccentricities of the bearing assembly. The scanning head is configured to scan the angle scaling.

The angle-scaling may be arranged on a lateral side of the graduated ring.

The angle scaling may be aligned to have a directional component parallel to the axis.

An axial extension of the graduated ring may vary in a radial direction.

The graduated ring may have a maximum axial extension at an inner wall.

A region of the graduated ring on which the angle scaling is applied may be at least partially disposed radially outside a minimum inner diameter of the outer ring.

The graduated ring may partially enclose the outer ring.

The angle scaling may have an alignment having a radial directional component.

The bearing assembly may be free of axial play.

According to an example embodiment of the present invention, a method for producing an angle-measurement system having an angle scaling, which is scannable by a scanning head, the angle-measurement system including a bearing assembly, which includes a graduated ring, an outer ring and rolling bodies, the graduated ring rotatable about an axis relative to the outer ring, includes: producing the graduated ring and the outer ring, a finely processed rolling surface being produced on each of the graduated ring and the outer ring, the rolling surface of the graduated ring having a smaller path radius than the rolling surface of the outer ring; assembling the bearing assembly such that the rolling surface of the outer ring is arranged opposite the rolling surface of the graduated ring and the rolling bodies are disposed between the two rolling surfaces such that the bearing assembly is free of radial play; fixing the graduated ring and the outer ring in place on components of a graduating machine that are rotatable relative to one another; applying the angle scaling directly onto the graduated ring, including rotating the graduated ring about the axis relative to the outer ring in the graduating machine.

The rolling surfaces may be produced with at least one of (a) a grinding process, (b) a honing process and (c) a lapping process.

The graduated ring may be produced by metal cutting such that an axial extension varies in a radial direction.

The bearing assembly assembling step may include producing a radial prestressing between the graduated ring and the outer ring.

The bearing assembly assembling step may include producing an axial prestressing between the graduated ring and the outer ring.

The outer ring may be fixed in place on a component of the graduating machine indirectly, via a coupler, for the application of the angle scaling on the graduated ring, the coupler remaining in the angle-measurement system after the application of the angle scaling.

The angle scaling may be applied in the angle scaling applying step by an ablation process.

The ablation process may include a laser ablation process.

The angle scaling may be applied in the angle scaling applying step so as to have a directional component parallel to the axis.

The angle scaling may be applied in the angle scaling applying step so as to have a radial directional component.

According to an example embodiment of the present invention, an angle-measurement system includes: a coupler dimensioned to be flexurally soft in a radial direction and in an axial direction; a scanning head; and a bearing assembly including: a graduated ring; an outer ring; and rolling bodies. The graduated ring us rotatable about an axis relative to the outer ring. A separate rolling surface is formed on each of the graduated ring and the outer ring, and the rolling surface of the graduated ring has a smaller path radius than the rolling surface of the outer ring. The rolling surface of the outer ring is arranged opposite the rolling surface of the graduated ring, and the rolling bodies are arranged between the two rolling surfaces such that the bearing assembly is free of radial play. An angle scaling is applied directly onto the graduated ring such that a geometrical pattern of the angle scaling in a first region deviates from a geometrical pattern of the angle scaling in a second region as a function of rotational eccentricities of the bearing assembly and of a characteristic of the coupler. The scanning head is configured to scan the angle scaling.

Further features and aspects of example embodiments of the present invention are described in more detail below with reference to the appended Figures.

DETAILED DESCRIPTION

Figure 1:
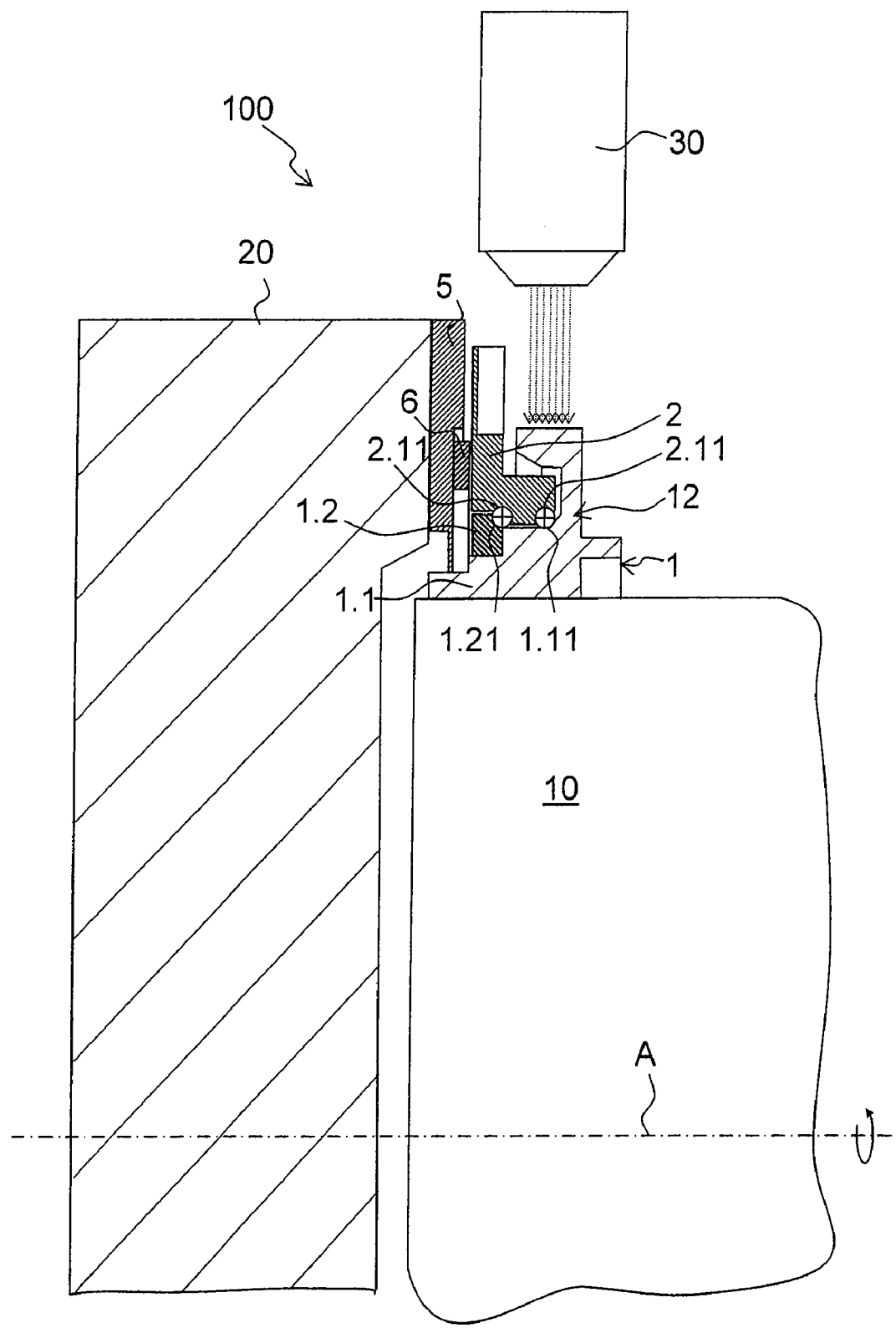
FIG. 1 is a partial sectional view of a premounted unit of an angle-measurement system on a graduating machine.
Figure 2:
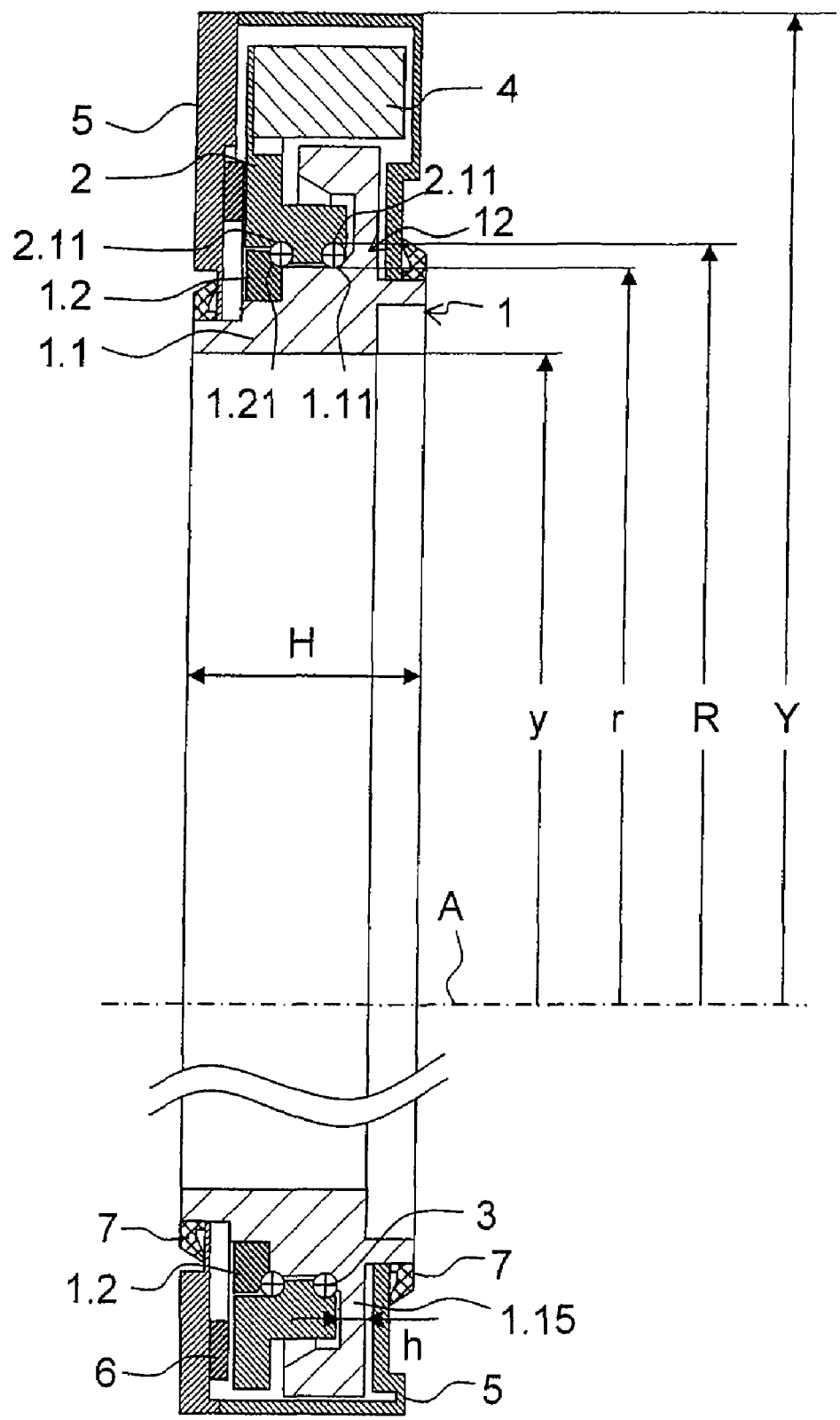
FIG. 2 is a sectional view of an angle-measurement system.

In the production method hereof, first a two-part inner ring 1, which is made up of a ring 1.1 and a second component 1.2, as well as an outer ring 2 are produced. As described below, angle scaling 1.12 is subsequently applied to ring 1.1. Thus, ring 1.1 is also referred to herein as a graduated ring 1.1, even at stages of the ring 1.1 where the angle scaling 1.12 might not yet have been applied to ring 1.1.

The contours are initially formed in a relatively rough manner using metal-cutting. In a further step, finely processed rolling surfaces 1.11, 1.21, 2.11 are produced on graduated ring 1.1, second component 1.2, and outer ring 2, with the aid of a lapping process. Rolling surface 1.11 on graduated ring 1.1 and rolling surface 1.12 on second component 1.2 are circularly convex in a plan view and have a path radius r, that is to say, the particular characteristic of rolling surfaces 1.11, 1.12 has path radius r. In contrast, rolling surface 2.11 on outer ring 2 extends along a circular line having path radius R and has a concave arrangement. Path radius r of rolling surface 1.11 on graduated ring 1.1 is smaller than path radius R of rolling surface 2.11 on outer ring 2.

Using a fine grinding step and a subsequent polishing process, an exceedingly precise lateral surface 1.14 is produced on graduated ring 1.1, largely concentrically to the extension of rolling surfaces 1.11 of graduated ring 1.1. In the next manufacturing step, a thin ablation layer is applied onto lateral side 1.14 of graduated ring 1.

Outer ring 2 and graduated ring 1.1 as well as balls 3 are subsequently assembled such that balls 3 are disposed as rolling bodies between the two rolling surfaces 1.11, 2.11. Second component 1.2 of inner ring 1 is then mounted with axial tension, thereby generating radial and axial prestressing between inner ring 1 and outer ring 2. This produces a bearing assembly 12 which includes inner ring 1 having graduated ring 1.1, outer ring 2 and balls 3 as rolling bodies, graduated ring 1.1 being rotatable about an axis A relative to outer ring 2. Due to the prestressing of second part 1.2 of inner ring 1 and the conical arrangement of rolling surfaces 1.11, 1.12, 2.11, entire bearing assembly 12 is prestressed axially and radially such that bearing assembly 12 exhibits no radial bearing play.

Furthermore, graduated ring 1.1 is configured such that its inner wall 1.13 has maximum extension H in the axial direction. This configuration achieves an optimal alignment of the angle-measurement system on the shaft to be measured during subsequent operation. Furthermore, graduated ring 1.1 partially encloses outer ring 2. Thus, there is a region 1.15 of graduated ring 1.1 between the radially outermost region and rolling surface 1.11 of graduated ring 1.1 that has a smaller axial extension h than the radially adjacent regions, which means that it is arranged as an annular, axial thin section.

A coupler 6, which is connected to a flange 5, is mounted on outer ring 2. During operation of the angle-measurement system, coupler 6 is to compensate for misalignments or axial errors between the shaft to be measured and a corresponding stator component at which the shaft to be measured is supported. For this reason coupler 6 is relatively flexurally soft in the radial and axial direction, whereas it has an exceedingly rigid operating behavior in the circumferential direction, so that angle-measurement errors are minimized.

Figure 3A:
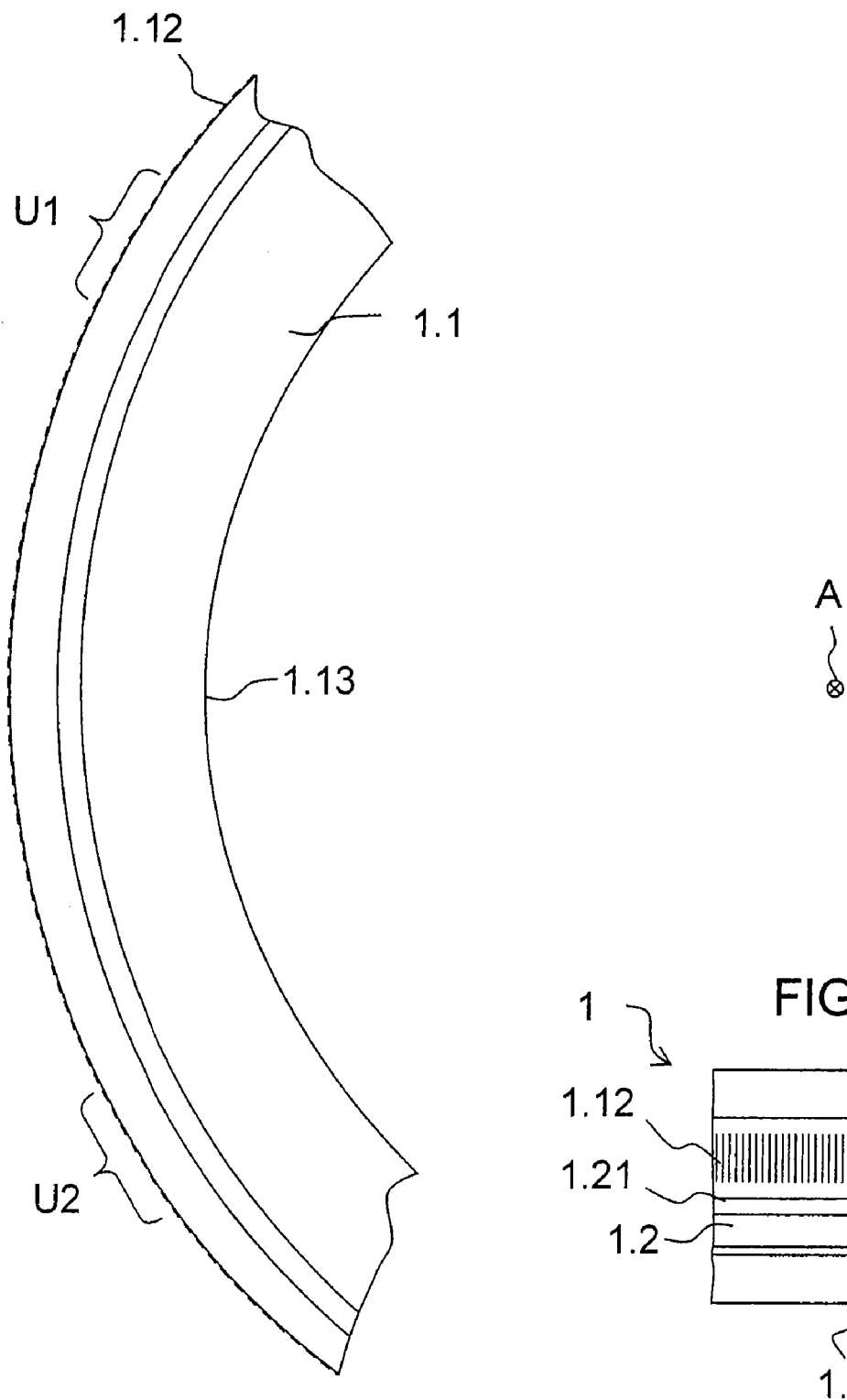
FIG. 3a is a plan view of a portion of a graduated ring of the angle-measurement system.
Figure 3B:
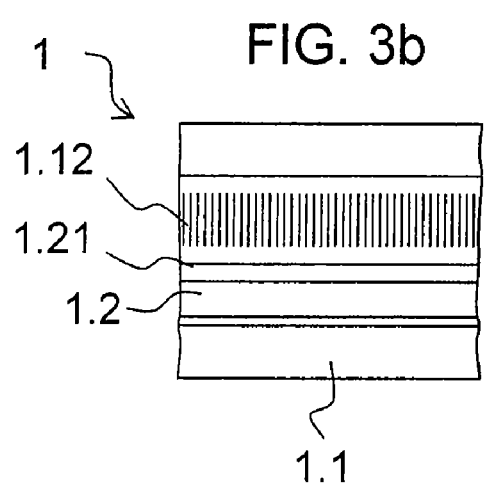
FIG. 3b is a side view of a partial area of a graduated ring of the angle-measurement system.

The unit assembled so far, made up of bearing assembly 12, coupler 6 and flange 5, is fixed in place on a graduating machine 100. Graduating machine 100 is used to apply an angle scaling 1.12 (FIG. 3b) on graduated ring 1.1, and it includes a shaft 10, a stator block 20, as well as a laser 30. Stator block 20 and shaft 10 are rotatable relative to one another using an air bearing. Also part of graduating machine 100 is an exceedingly precise angle-measurement device, which is used to precisely determine the angular position of shaft 10 relative to stator block 20.

Prior to applying angle scaling 1.12, graduated ring 1.1 is first fixed in place on shaft 10 of graduating machine 100 in a torsionally fixed manner so as have direct contact. Outer ring 2 is also fixed in place on stator block 20, but in this case, an indirect affixation via coupler 6 and flange 5 is implemented. A rotation of shaft 10 in this assembly state therefore causes a rotation of inner ring 1 or graduated ring 1.1.

With the aid of a laser ablation process, angle scaling 1.12, made up of a multitude of graduation markings, is applied directly onto lateral side 1.14 of graduated ring 1.1. In the process, using individual mark ablation, laser 30 creates graduation marks as angle scaling 1.12 on lateral side 1.14 in a step-by-step manner, substantially parallel to axis A. The spacing of the centers of the graduation marks may be, e.g., 20 μm. Following the production of each graduation marking on lateral side 1.14 of graduated ring 1.1, shaft 10 is rotated further ever so slightly, so that the next graduation mark is able to be applied. That is to say, the angle-measurement device rotates graduated ring 1.1 further about axis A in a controlled manner between the individual exposure steps. Notwithstanding the exceedingly precise production of bearing assembly 12, it still exhibits intrinsic deviations from its ideal geometry. In a corresponding manner, radial eccentricities of bearing assembly 12 lead to geometric patterns of angle scaling 1.12 that differ in the circumferential direction, since angle scaling 1.12 is applied on graduated ring 1.1 in an add-on situation that corresponds to the final mounting, and bearing assembly 12 is radially and axially prestressed in addition. As a result, the geometric pattern of angle scaling 1.12 in region U1 may deviate from the pattern in region U2 because of the so-called radial eccentricities, such as an eccentricity or a wobble error, specifically as a function of the radial eccentricity locally present at the particular circumferential points. In addition, the characteristic of coupler 6 also may have an effect on the pattern of angle scaling 1.12, so that potential errors attributable to coupler 6 are also compensated for by the particular pattern of angle scaling 1.12 in region U1, U2. As a consequence, different patterns may be characterized by different clearances of the graduation markings or by different inclinations of the graduation markings relative to axis A. Due to the high measure of precision of bearing assembly 12, these differences in the patterns of individual regions are relatively negligible. Nevertheless, they contribute to the increase in the measuring accuracy of the angle-measurement system.

After angle scaling 1.12 is applied, the preassembled unit, made up of bearing assembly 12, coupler 6 and flange 5, may be dismounted from graduating machine 100. During the final assembly, a scanning head 4 is then first installed on outer ring 2. Although the angle scaling on graduated ring 1.1 is applied such that a geometric pattern of angle scaling 1.12 in first region U1 deviates from the pattern in second region U2 as a function of the particular local radial eccentricities of bearing assembly 12, the same type of scanning head 4 may always be used to scan angle scaling 1.12.

Then, a housing lid 8 is mounted on flange 5 so that scanning head 4 and angle scaling 1.12 are protected against external influences. Furthermore, this protection is improved by placing sealing rings 7 between graduated ring 1.1 and flange 5. The angle-measurement system thus represents an autonomous unit, which the user is readily able to mount on a shaft to be measured, but which supplies exceedingly precise angular positions.

As already mentioned, graduated ring 1.1 partially surrounds outer ring 2. Analogously to this arrangement, angle scaling 1.12 is able to be applied on a relatively large circumference, which increases the precision of the angle-measurement system.

During operation of the angle-measurement system, a light source within housing lid 8 transmits light through an optical system onto angle scaling 1.12. This light, modulated as a function of the position, is reflected from angle scaling 1.12 to scanning head 4. In scanning head 4, the modulated light is converted by photo elements into position-dependent photo currents and processed further electronically.

As an alternative, angle scaling 1.12 may also be applied directly on graduated ring 1.1 as magnetic graduation. Accordingly, magnetic sensors are disposed in scanning head 4, which convert magnetic fields, modulated as a function of the position, into position-dependent currents or voltages.

Since lateral surface 1.14 is processed very finely, scanning head 4 is able to be placed with a minimal scanning gap with respect to angle scaling 1.12, which results in better signal quality and thus a better measuring result.

Furthermore, the angle-measurement system is very compact in its outer dimensions due to the integrated design, and it has, e.g., an exceedingly small maximum axial extension H. In the illustrated exemplary embodiment, axial extension H amounts to only approximately 25% of maximum outer radius Y. Furthermore, the described arrangement produces a high-quality angle-measurement system, which is suitable for large diameters of the shafts to be measured. For example, the angle-measurement system has a corresponding opening whose inner radius y corresponds to approximately 66% of maximum outer radius Y (y/Y=2/3).

What is claimed is:

1. An angle-measurement system, comprising:
   a scanning head; and
   a bearing assembly including:
      graduated ring;
      an outer ring; and
      rolling bodies;
   wherein the graduated ring is rotatable about an axis relative to the outer ring;
   wherein a separate rolling surface is formed on each of the graduated ring and the outer ring, the rolling surface of the graduated ring having a smaller path radius than the rolling surface of the outer ring;
   wherein the rolling surface of the outer ring is arranged opposite the rolling surface of the graduated ring, the rolling bodies arranged between the two rolling surfaces such that the bearing assembly is free of radial play;
   wherein an angle scaling is applied directly onto the graduated ring such that a geometrical pattern of the angle scaling in a first region deviates from a geometrical pattern of the angle scaling in a second region as a function of rotational eccentricities of the bearing assembly; and
   wherein the scanning head is configured to scan the angle scaling.

2. The angle-measurement system according to claim 1, wherein the angle-scaling is arranged on a lateral side of the graduated ring.

3. The angle-measurement system according to claim 2, wherein the angle scaling is aligned to have a directional component parallel to the axis.

4. The angle-measurement system according to claim 1, wherein an axial extension of the graduated ring varies in a radial direction.

5. The angle-measurement system according to claim 1, wherein the graduated ring has a maximum axial extension at an inner wall.

6. The angle-measurement system according to claim 1, wherein a region of the graduated ring on which the angle scaling is applied is at least partially disposed radially outside a minimum inner diameter of the outer ring.

7. The angle-measurement system according to claim 1, wherein the graduated ring partially encloses the outer ring.

8. The angle-measurement system according to claim 1, wherein the angle scaling has an alignment having a radial directional component.

9. The angle-measurement system according to claim 1, wherein the bearing assembly is free of axial play.

10. A method for producing an angle-measurement system having an angle scaling, which is scannable by a scanning head, the angle-measurement system including a bearing assembly, which includes a graduated ring, an outer ring and rolling bodies, the graduated ring rotatable about an axis relative to the outer ring, comprising:

producing the graduated ring and the outer ring, a finely processed rolling surface being produced on each of the graduated ring and the outer ring, the rolling surface of the graduated ring having a smaller path radius than the rolling surface of the outer ring;

assembling the bearing assembly such that the rolling surface of the outer ring is arranged opposite the rolling surface of the graduated ring and the rolling bodies are disposed between the two rolling surfaces such that the bearing assembly is free of radial play;

fixing the graduated ring and the outer ring in place on components of a graduating machine that are rotatable relative to one another; and applying the angle scaling directly onto the graduated ring, including rotating the graduated ring about the axis relative to the outer ring in the graduating machine.

11. The method according to claim 10, wherein the rolling surfaces are produced with at least one of (a) a grinding process, (b) a honing process and (c) a lapping process.

12. The method according to claim 10, wherein the graduated ring is produced by metal cutting such that an axial extension varies in a radial direction.

13. The method according to claim 12, wherein the bearing assembly assembling step includes producing a radial prestressing between the graduated ring and the outer ring.

14. The method according to claim 10, wherein the bearing assembly assembling step includes producing an axial prestressing between the graduated ring and the outer ring.

15. The method according to claim 10, wherein the outer ring is fixed in place on a component of the graduating machine indirectly, via a coupler, for the application of the angle scaling on the graduated ring, the coupler remaining in the angle-measurement system after the application of the angle scaling.

16. The method according to claim 10, wherein the angle scaling is applied in the angle scaling applying step by an ablation process.

17. The method according to claim 16, wherein the ablation process includes a laser ablation process.

18. The method according to claim 10, wherein the angle scaling is applied in the angle scaling applying step so as to have a directional component parallel to the axis.

19. The method according to claim 10, wherein the angle scaling is applied in the angle scaling applying step so as to have a radial directional component.

20. An angle-measurement system, comprising:
a coupler dimensioned to be flexurally soft in a radial direction and in an axial direction;
a scanning head; and
a bearing assembly including:
a graduated ring;
an outer ring; and
rolling bodies;
wherein the graduated ring is rotatable about an axis relative to the outer ring;
wherein a separate rolling surface is formed on each of the graduated ring and the outer ring, the rolling surface of the graduated ring having a smaller path radius than the rolling surface of the outer ring;
wherein the rolling surface of the outer ring is arranged opposite the rolling surface of the graduated ring, the rolling bodies arranged between the two rolling surfaces such that the bearing assembly is free of radial play;
wherein an angle scaling is applied directly onto the graduated ring such that a geometrical pattern of the angle scaling in a first region deviates from a geometrical pattern of the angle scaling in a second region as a function of rotational eccentricities of the bearing assembly and of a characteristic of the coupler; and
wherein the scanning head is configured to scan the angle scaling.

* * * * *